United States Patent [19]
Ott

[11] Patent Number: 5,730,674
[45] Date of Patent: Mar. 24, 1998

[54] PRIMARY DRIVE CHAIN TENSION ADJUSTER

[76] Inventor: Vern D. Ott, 1839 Rte. 746 South, Cardington, Ohio 43315

[21] Appl. No.: 602,959

[22] Filed: Feb. 16, 1996

[51] Int. Cl.$^6$ .................................................. F16H 7/08
[52] U.S. Cl. .................................... 474/111; 474/135
[58] Field of Search ............................. 474/111, 135, 474/133, 101, 273

[56] References Cited

U.S. PATENT DOCUMENTS

| | | | |
|---|---|---|---|
| 4,339,506 | 7/1982 | Martin | 428/519 |
| 4,713,043 | 12/1987 | Bierdermann | 474/111 |
| 4,921,472 | 5/1990 | Young | 474/111 |
| 5,049,114 | 9/1991 | Hayden | 474/111 |
| 5,266,066 | 11/1993 | White | 474/111 |
| 5,425,680 | 6/1995 | Young | 474/111 |
| 5,462,493 | 10/1995 | Simpson | 474/111 |

FOREIGN PATENT DOCUMENTS

| | | |
|---|---|---|
| 628750 | 12/1994 | European Pat. Off. . |
| 4001303 | 7/1991 | Germany . |

*Primary Examiner*—Roger J. Schoeppel
*Attorney, Agent, or Firm*—Sidney W. Millard; Kremblas, Foster Millard & Pollick

[57] ABSTRACT

A primary drive chain tension adjuster having a hinged arm pivotably mounted to a base, and a low friction nylon ride mounted on the upper, opposite end of the hinged arm. A spring, preferably a urethane elastomer sheet, is positioned beneath the hinged arm. When the hinged arm is pivoted downwardly, the underside of the hinged arm compresses the urethane sheet, which exerts a spring force upwardly against the hinged arm. As a chain riding across the ride slackens, the urethane sheet forces the hinged arm upwardly taking up the slack in the chain.

10 Claims, 10 Drawing Sheets

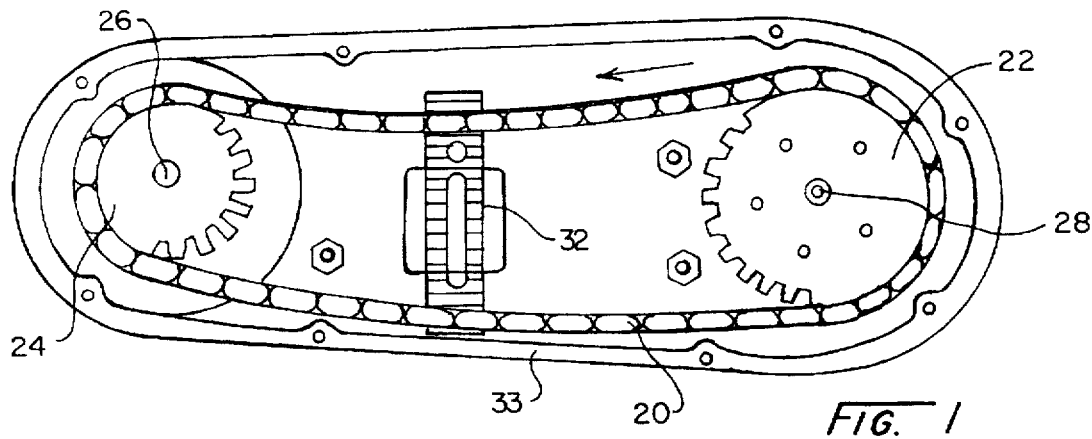
FIG. 1
PRIOR ART
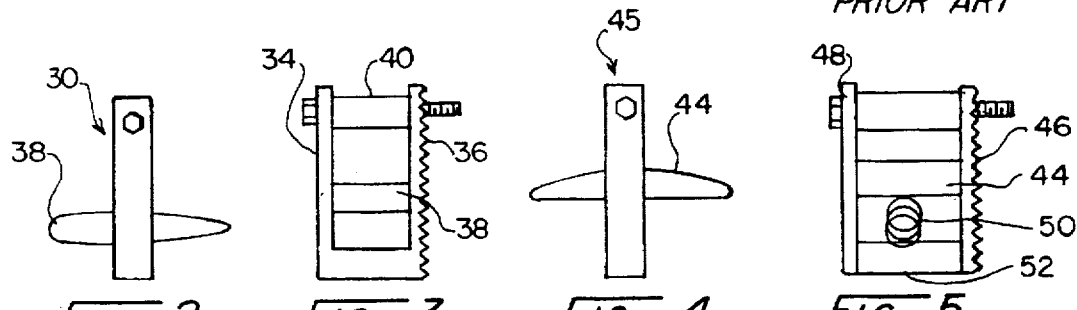
FIG. 2
PRIOR ART
FIG. 3
PRIOR ART
FIG. 4
PRIOR ART
FIG. 5
PRIOR ART
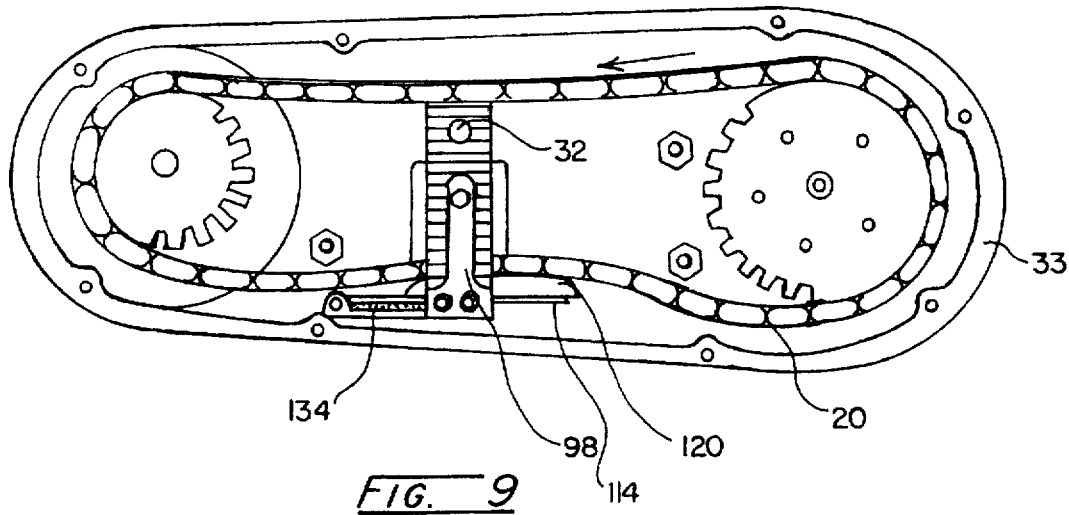
FIG. 9

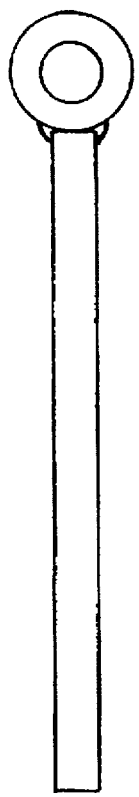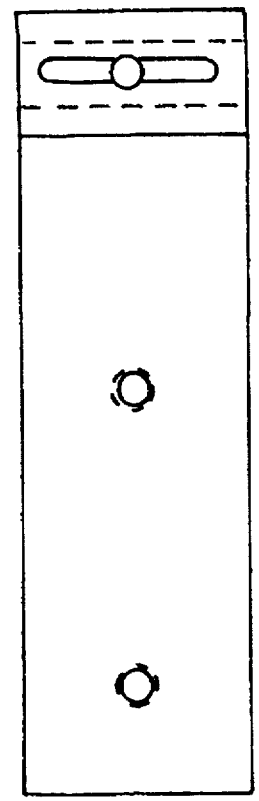
FIG. 10
FIG. 22

5,730,674

PRIMARY DRIVE CHAIN TENSION ADJUSTER

TECHNICAL FIELD

The invention relates generally to drive chain assemblies, and more specifically to devices for maintaining the tension in a drive chain.

BACKGROUND ART

In a drive system involving a chain and sprockets, there are normally two or more sprockets connected to separate shafts. An example of such a system is the primary drive chain and sprockets of a HARLEY DAVIDSON brand motorcycle, shown in FIG. 1. A chain 20 is wound around the sprockets 22 and 24, spanning the distance between them. If the shafts 26 and 28 are spaced horizontally from one another, the spans of chain 20 between the sprockets 22 and 24 sag downwardly due to gravity. Upon rapid acceleration, deceleration or operation at specific engine speeds, the chain spans can shake violently, causing severe wear.

The original manufacturer attaches a chain tension adjuster 30, shown in FIG. 2, to the toothed panel 32 mounted at the back of the drive chain housing 33. The adjuster 30 comprises a pair of parallel bars 34 and 36, one of which has grooves forming teeth which interengage with teeth on the toothed panel 32. A low friction chain ride 38 is positioned between the parallel bars 34 and 36 and the chain extends through the hole between the spacer 40 and the ride 38. The tension adjuster 30 is mounted on the toothed panel 32 at a height which gives a suitable chain tension. Unfortunately, the tension when the chain is cold must be more loose than is optimum to permit the chain 20 to tighten when it and other engine parts heat up. Even after the engine heats up and the chain 20 tightens, the chain 20 will still have intervals of time in which chain tension is not optimal.

Since the ride 38 does not constantly seat against the chain 20, the ride 38 loses its influence on the chain 20 at times. In particular, when the chain vibrates violently due to resonance at specific frequencies and when rapid changes in engine speed cause momentary decreases or increases in tension. It is at these times that the adjuster 30 is of little or no help.

An attempt at a solution to the problem was disclosed in U.S. Pat. No. 5,049,114 to Hayden, which is also shown in FIG. 4. The adjuster 45 is similar to the one shown in FIGS. 2 and 3 but differs in that the ride 44 has grooves and is mounted with the parallel beams 46 and 48 in the grooves, permitting vertical, but not horizontal movement of the ride 44. A spring 50 is positioned between a lower bar 52 and the ride 44. The adjuster 45 is positioned on the toothed plate 32 like the adjuster 30 to provide constant tension on the chain 20.

The Hayden adjuster 45 has the disadvantage that as the chain 20 oscillates up and down during specific engine speeds, the sprung ride 44 merely oscillates with the chain 20 since there is little dampening of the motion. The abnormal wear on the chain 20 due to this oscillation is therefore not prevented by the Hayden adjuster.

Therefore, the need exists for a chain tension adjuster which maintains the tightness of the chain throughout the temperature range (and tension range), and which does not merely oscillate with the oscillating chain.

BRIEF DISCLOSURE OF INVENTION

The invention is a constant tension chain adjuster having a biased, hinged ride bearing against a drive chain. The bias varies with the position of the ride.

BRIEF DESCRIPTION OF DRAWINGS

FIG. 1 is a side view illustrating a prior art primary drive chain in its housing;

FIG. 2 is a side view illustrating a prior art chain ride;

FIG. 3 is an end view illustrating the chain ride of FIG. 2;

FIG. 4 is a side view illustrating a prior art chain ride;

FIG. 5 is an end view illustrating the prior art chain ride;

FIG. 9 is a side view illustrating the preferred embodiment of the present invention in its operable position in the primary drive chain housing;

FIG. 10 is an end view illustrating the preferred hinged arm;

FIG. 22 is a top view illustrating the hinged arm;

Figure 6:
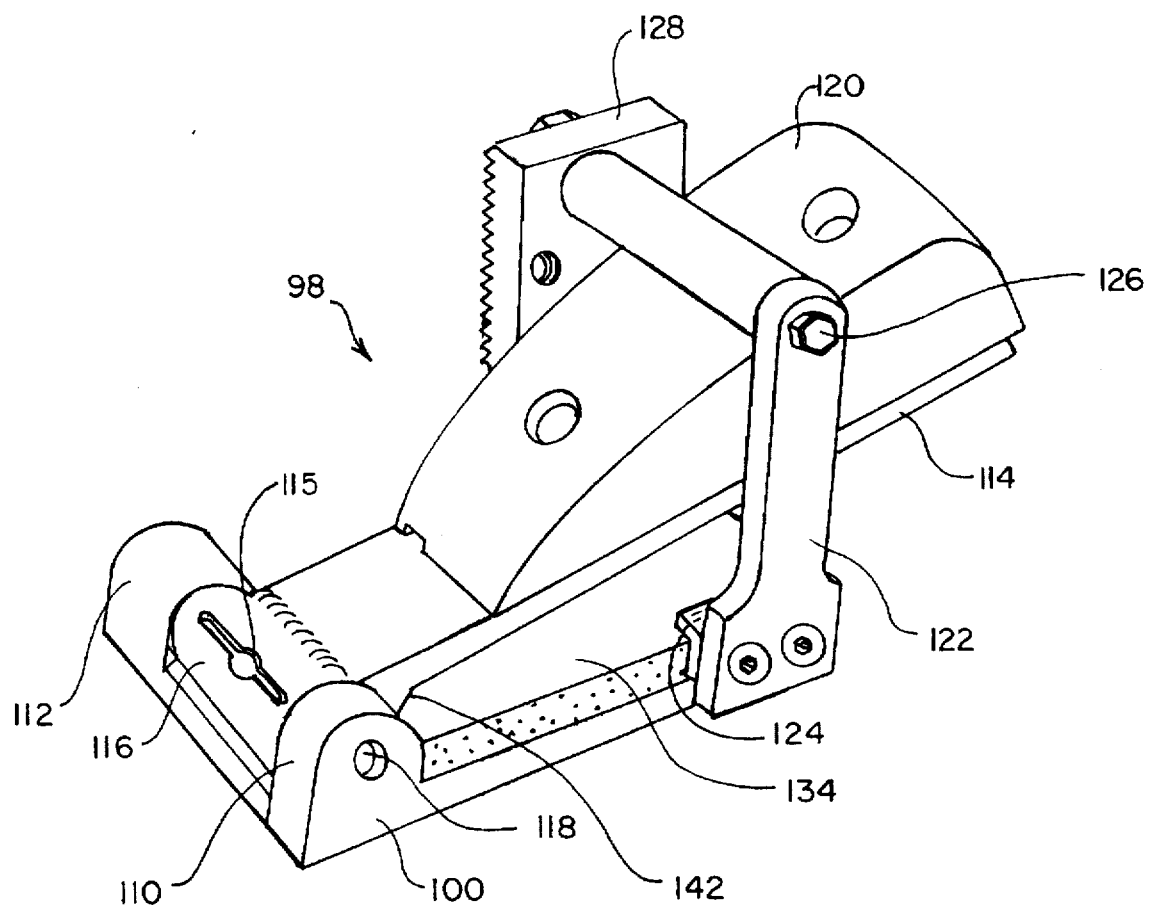
FIG. 6 is a view in perspective illustrating the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

The preferred adjuster 98 is shown in FIG. 6. The base 100 is a rigid, preferably steel plate having two upwardly extending ears 110 and 112. Each ear 110 and 112 has a cylindrical aperture formed through it, and the apertures align along a single axis. A hinged ride arm 114 pivotably mounts to the base 100 where the hinged end 116 of the hinged arm 114 mounts between the ears 110 and 112. A pivot pin 118 extends through the cylindrical apertures in ears 110 and 112 and through an axially aligned cylindrical aperture formed through the hinged end 116. An oil orifice 115 is formed in the upper surface of the hinged end 116. The orifice 115 leads into the aperture formed through the hinged end 116 into which the pivot pin 118 is inserted. The orifice 115 allows oil which flows through the primary drive chain housing 33 (shown in FIG. 9) to enter the aperture in which the pin 118 is mounted. A helical groove is formed in the surface of the pin 118 permitting oil to lubricate the entire length of the interface between the outer surface of the pin 118 and the contacting surface at the aperture formed in the hinged end 116.

The hinged arm 114 is pivotable about the pin 118 through an arcuate path. A chain ride 120 is rigidly fastened to the hinged arm 114 end opposite the hinged end 116. The ride 120 can be made of any low friction material, but is preferably made of nylon or, alternatively, urethane.

An upright 122 fastens rigidly to the base 100 at an upwardly extending ear 124, which is an extension of the base 100. The upright 122 has an aperture formed at its upper end through which a bolt 126 extends. The bolt 126 is longer than the width of the base 100, permitting the bolt 126 to extend beyond the opposite side of the base 100 through an aperture in the mounting panel 128. The mounting panel 128 is rigidly attached, preferably by welding, to the opposite side of the base 100 from the upright 122. The mounting panel 128 has a rear surface 130 (best seen in FIG. 7) having grooves forming teeth 132. A finger 131 extends from the mounting panel 128 to align the bolt 126 and teeth 132 with the toothed panel 32 shown in FIG. 9. A spacer 140 is positioned around the bolt 126 between the mounting panel 128 and the upright 122 so that when the bolt 126 tightens the mounting panel 128 against the toothed panel 32, neither the mounting panel 128 nor the upright 122 will be bent.

A spring, preferably a resilient, elastomeric urethane sheet 134, is positioned between the base 100 and the hinged arm 114. When the hinged arm 114 is pivoted downwardly against the sheet 134, the sheet 134 is compressed, exerting an opposite force against the underside of the hinged arm 114.

Figure 7:
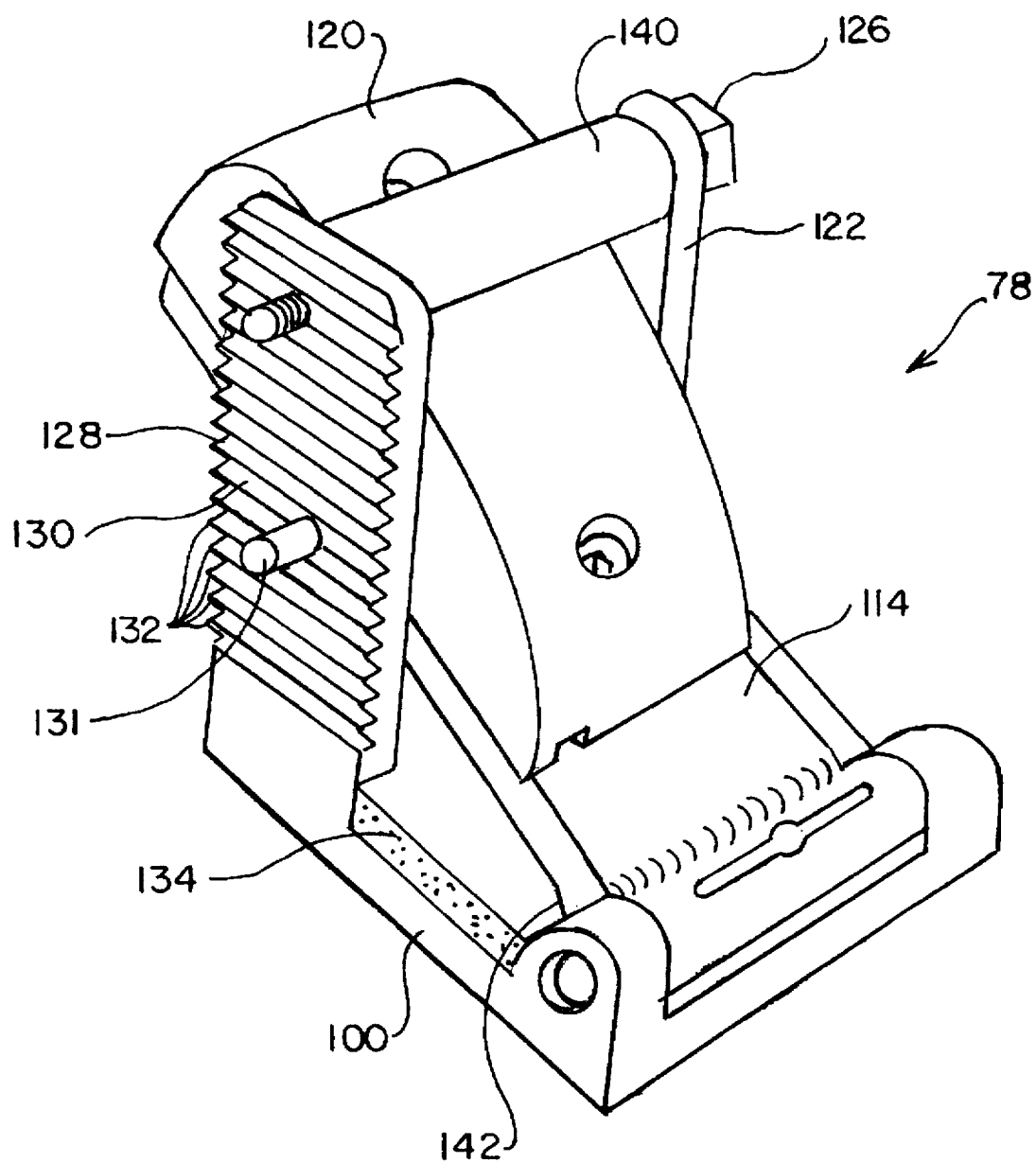
FIG. 7 is a view in perspective illustrating the preferred embodiment of the present invention.
Figure 8:
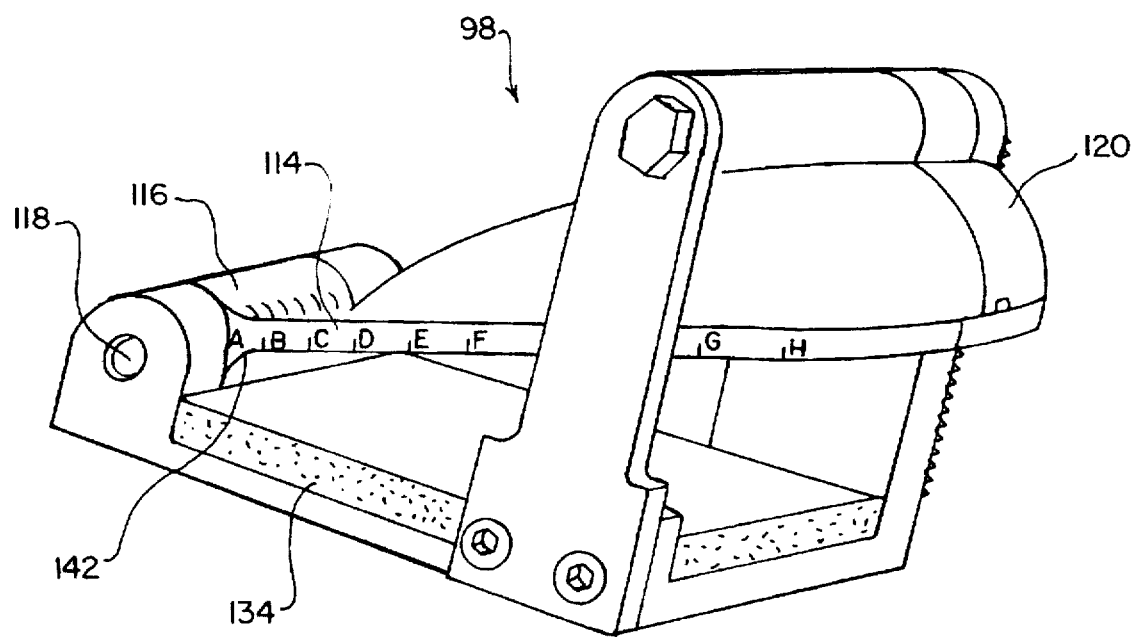
FIG. 8 is a view in perspective illustrating the preferred embodiment of the present invention.
Figure 11:
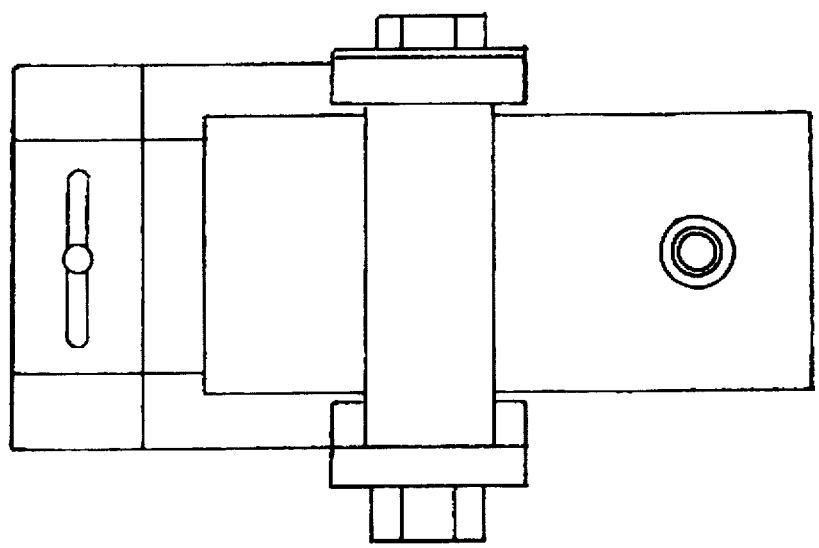
FIG. 11 is a top view illustrating the preferred embodiment.
Figure 12:
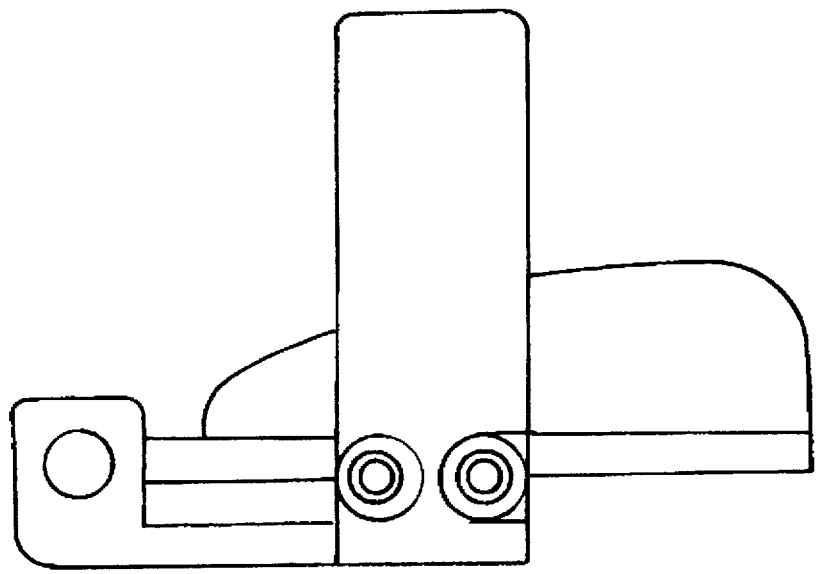
FIG. 12 is a side view illustrating the preferred embodiment.
Figure 13:
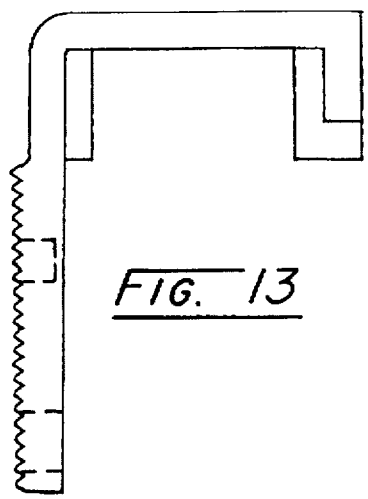
FIG. 13 is an end view illustrating the base and mounting panel.
Figure 14:
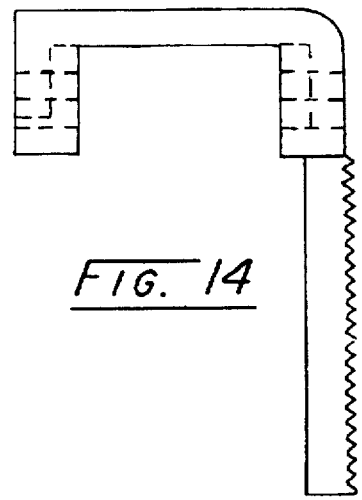
FIG. 14 is an end view illustrating the base and mounting panel.
Figure 16:
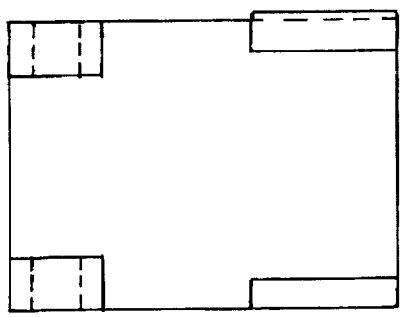
FIG. 16 is a top view illustrating the base and mounting panel.
Figure 15:
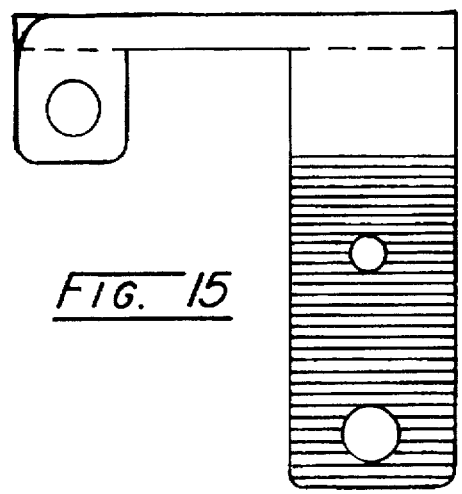
FIG. 15 is a side view illustrating the base and mounting panel.
Figure 17:
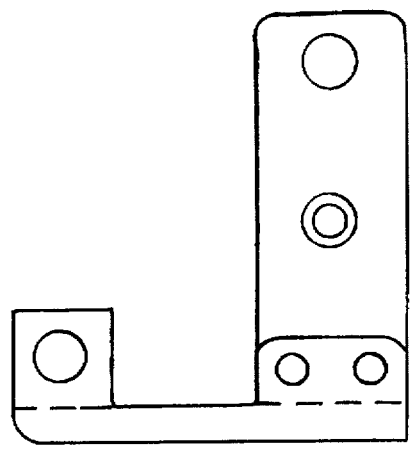
FIG. 17 is a side view illustrating the base and mounting panel.
Figure 18:
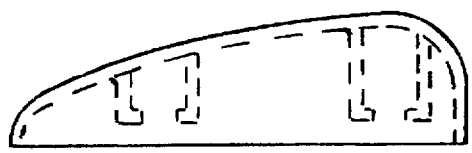
FIG. 18 is a side view illustrating the ride.
Figure 19:
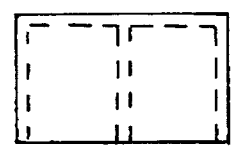
FIG. 19 is an end view illustrating the ride.
Figure 21:
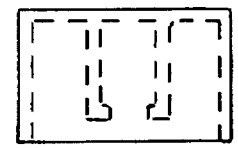
FIG. 21 is an end view illustrating the ride.
Figure 20:
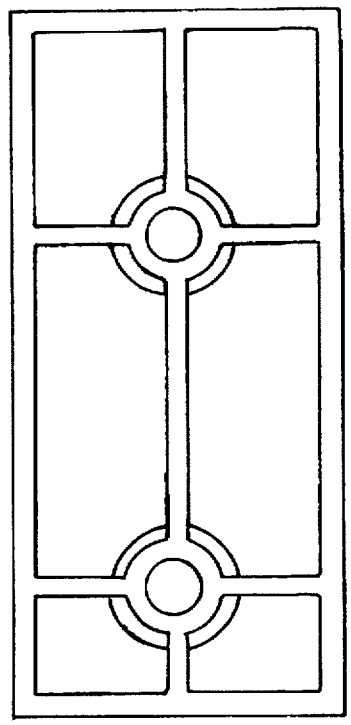
FIG. 20 is an underneath view illustrating the ride.
Figure 24:
FIG. 24 is an end view illustrating the knob.
Figure 23:
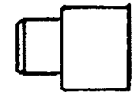
FIG. 23 is a side view illustrating the knob.
Figure 25:
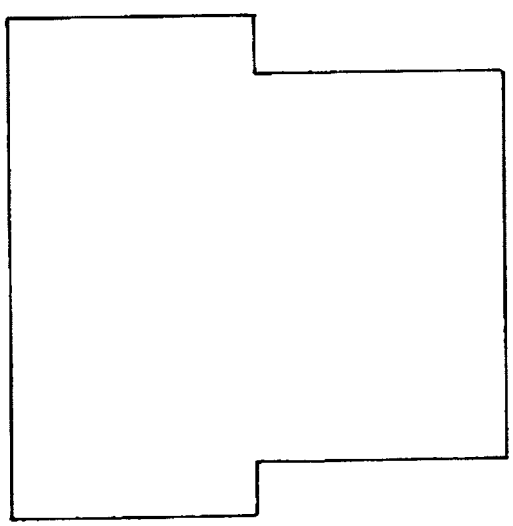
FIG. 25 is a top view illustrating the urethane sheet.
Figure 26:
FIG. 26 is an end view illustrating the urethane sheet.
Figure 27:
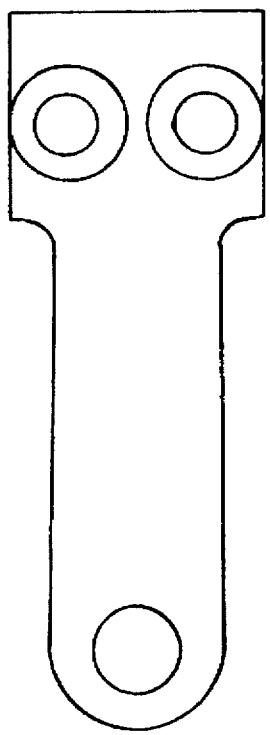
FIG. 27 is a side view illustrating the upright.
Figure 29:
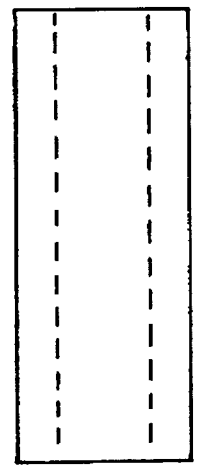
FIG. 29 is a top view illustrating the spacer.
Figure 28:
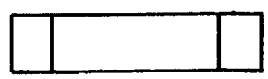
FIG. 28 is a top view illustrating the upright.
Figure 30:
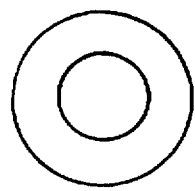
FIG. 30 is an end view illustrating the spacer.

The hinged arm 114 has, at its joint with the hinged end 116, an inclined heel 142 which rests against the sheet 134 compressing the sheet 134 when the hinged arm 114 is in the position shown in FIGS. 6–8. The heel 142 provides a limited amount of pre-compression of the sheet 134 without creating a substantial upwardly directed force on the hinged arm 114. This pre-compression ensures that a chain between the spacer 140 and the ride 120 will always have some tension against it. The shape of the heel 142 and the underside of the hinged arm 114 provides a variable spring constant, k for varying the force exerted on the hinged arm 114 based on the position of the hinged arm 114. This is described in greater detail below.

FIG. 9 shows the preferred adjuster 98 in its operable position in the primary drive chain housing 33. In the position shown in FIG. 9, the ride 120 is exerting an upwardly directed force against the chain 20, removing slack from the chain 20. The urethane sheet 134 is compressed a substantial amount in this position. FIG. 9 shows the position of the ride 120 once the chain 20 has tightened substantially due to being at operating temperature. When the adjuster 98 is put into position and the chain is cold, the hinged arm 114 is positioned upwardly from where it is shown in FIG. 9. As the engine reaches its normal operating temperature and the chain 20 tightens, the hinged arm 114 is pivoted downwardly by the tightening chain 20 exerting a greater and greater force against the ride 120.

In addition to tension variations during temperature changes, when the operator changes engine speed rapidly such as during shifts in gears, slack in the chain 20 is often created and then taken up. During these rapid variations in engine speed, the variations in tension are accommodated and "smoothed out" by the bias force exerted on the chain 20 by the ride 120. This bias force varies according to the position of the hinged arm 114 to provide greater force (faster accommodation) when rapid changes in tension occur. The variable spring constant is a result of the shape of the hinged arm 114, the base 100 and the sheet 134.

FIG. 10 shows the preferred hinged arm 114. The hinged arm 114 is preferably made from a plate 150 welded to a cylindrical tube 152. At the weld formed between these two parts, the angled heel 142 is formed by flattening the weld bead on the underside of the hinged arm 114.

The first portion of the hinged arm 114 to compress the urethane sheet 134 is the angled heel 142. The volume of the sheet 134 which is compressed when only the angled heel 142 compresses the sheet 134 is substantially less than the volume compressed when the hinged arm 114 is pivoted downwardly substantially further. Therefore the force exerted on the hinged arm 114 by the sheet 134 is substantially less in the former situation than in the latter.

Referring to FIG. 8, the letters A, B, C, D, E, F, G, and H are used to indicate positions along the hinged arm 114. As the underside of the hinged arm 114 at the points denoted by the letters A–G contact the urethane sheet 134 when the hinged arm 114 is pivoted downwardly, an increasing force is necessary to compress the sheet 134 further. Therefore, an increased oppositely directed force is applied by the sheet 134 to the hinged arm 114. When only the angled heel 142 compresses the sheet 134, a small force (on the order of a few pounds or less) is necessary to maintain the hinged arm 114 in its position. Therefore, only a small force is applied by the ride 120 in the opposite direction against the chain 20. Once the hinged arm 114 is pivoted far enough that point B contacts the sheet 134, the force necessary to compress the sheet 134 increases since a greater portion of the urethane sheet 134 is compressed by the inclined heel 142. When the hinged arm 114 pivots so far that point C contacts the sheet 134, the force necessary to compress the sheet 134 is greater than when it was at point B, and is increasing at a rate greater than its rate of increase from point A to point B. This is because the angle of the hinged arm 114 is smaller relative to the base 100 than the heel 142, meaning the rate of increase in volume of sheet 134 compressed is greater for a given displacement of the hinged arm 114 once the hinged arm 114 begins to compress the sheet 134 after point B. As points D, E, F, G, and H contact and begin to compress the urethane sheet 134, the spring force exerted upwardly on the hinged arm 114 becomes substantially higher than at points A and B. This indicates a spring constant, k, which varies with the position of the hinged arm 114. The greater the downward displacement of the hinged arm 114, the greater the k. The k could be varied even more by other changes in the underside shape of the hinged arm 114.

It is believed that the increase in spring constant is due to the rather rapid change in the volume of the urethane sheet 134 compressed by the hinged arm 114 between points B and H. The increased volume of sheet 134 compressed by the hinged arm 114 between points A and B is less than between points B and H, and the change in spring constant between points A and B is accordingly less than between points B and H.

The varying spring constant due to variations in displacement of the hinged arm 114 results in a force applied to the motorcycle chain which varies based on the relative looseness or tightness of the chain. When the motorcycle is cold, the chain has a substantial amount of slack, but this slack will decrease relatively quickly as the engine warms up and reaches operating temperature. The spring force exerted on the chain during this take-up due to the engine reaching operating temperature should not be substantially high, because this take-up is expected to occur and therefore should not be resisted significantly. This take-up is accommodated during the displacement in which the angled heel 142 compresses the urethane sheet 134. Some force must be applied to the chain in order to keep the chain from oscillating violently during warm-up, which could cause damage, and a small force is suitable.

Once operating temperature is reached, only small variations in chain tension will occur, due to changes in engine speed at acceleration or deceleration. These changes are rapid, and therefore the slack must be taken up rapidly. During this time, a high spring force is necessary to rapidly take up slack which is created. This take-up is accommodated during the compression of the sheet 134 by the flat underside of the hinged arm 114 and the angled heel 142.

The preferred sheet 134 is a urethane having a Durometer Hardness of between 10 and 75 on the Shore A scale at the outer range, preferably between 35 and 63 and most preferably about 50. The material also has a Recovery Delay of between about 0.01 and 1 second in the outer range, and preferably between about 0.1 and 0.3 seconds. Preferably, a polyester based urethane is cured with polyols in a small amount of water and acid mix. This generates ureas to enhance biuret cross-linking. The urea presence further inhibits plasticizer reaction. The crosslinking is controlled so as to yield a polymer matrix under nonzero stress. The combined stress matrix and plasticizer results in heightened mechanical damping properties, and good hardness control within plus or minus two points on the Shore A scale. The damping mechanism with this formulation method is a combination of hysteretic and viscous damping. Although this material is preferred, any material having similar characteristics of Hardness and Recovery Delay could be substituted. These would be equivalents and would be known to those skilled in the art.

The preferred urethane absorbs energy transmitted to it from the oscillating chain, whereas coil springs are so efficient that they absorb far less energy, almost none. Furthermore, the spring constant, k, of the sheet 134 is easily varied by the formation of the angled heel 142 or any other structure a person of ordinary skill will see as apparent from this disclosure. On the contrary, the spring constant of a coil or other conventional spring is substantially more difficult to vary.

The sheet 134 used in the sprung body of the present invention avoids the tendency to resonate in the range of frequencies in which the motorcycle chain operates. The prior art coil spring and ride has a tendency to oscillate violently at certain rates of revolution. The present invention, on the contrary, must either absorb a substantial amount of energy to prevent this resonance, or the sprung body comprising the hinged arm 114, the ride 120 and the sheet 134 must have a natural frequency of oscillation which is outside of the range of frequency in which the drive chain operates. The preferred embodiment at least absorbs energy, and can be made to have a natural frequency outside the range.

While certain preferred embodiments of the present invention have been disclosed in detail, it is to be understood that various modifications may be adopted without departing from the spirit of the invention or scope of the following claims.

I claim:

1. A drive chain tension adjusting apparatus comprising:
   (a) a base;
   (b) a ride, hingedly mounted to the base, for resting against the chain;
   (c) an elastomeric resin sheet mounted between the ride and the base, for biasing the ride against the chain; and
   (d) an angled heel bridging between said ride and a hinged end, said hinged end being mounted to pivot about an axis extending perpendicular to the chain,
   said heel being in contact with said sheet and maintaining the contacted area in compression, for thereby maintaining a pivoting bias to said ride toward said chain.

2. The tension adjusting apparatus of claim 1 wherein said hinge axis, ride and sheet are configured and mounted together such that pivoting of said ride away from said chain increases the area of contact between said ride and said sheet, thereby increasing the bias by said sheet on said ride toward said chain.

3. The tension adjusting apparatus according to claim 2 wherein said ride has a flat surface facing toward a flat surface of said sheet.

4. The tension adjusting apparatus of claim 3 wherein said sheet is comprised of urethane having a Durometer Hardness on the Shore A scale in the range of 10–75.

5. The tension adjusting apparatus of claim 4 wherein said ride has a curved surface facing toward said chain, said curved face being comprised of low friction resin material.

6. The tension adjusting apparatus of claim 5 wherein said resin material is selected from a group consisting of nylon and urethane.

7. The tension adjusting apparatus according to claim 1 wherein said ride has a flat surface facing toward a flat surface of said sheet.

8. The tension adjusting apparatus of claim 1 wherein said sheet is comprised of urethane having a Durometer Hardness on the Shore A scale in the range of 10–75.

9. The tension adjusting apparatus of claim 1 wherein said ride has a curved surface facing toward said chain, said curved surface being comprised of low friction resin material.

10. The tension adjusting apparatus of claim 9 wherein said resin material is selected from a group consisting of nylon and urethane.

* * * * *